(12) United States Patent
Yoon et al.

(10) Patent No.: US 11,862,062 B2
(45) Date of Patent: Jan. 2, 2024

(54) DISPLAY DEVICE AND METHOD FOR CONTROLLING THE SAME BASED ON DETERMINED MOTION WITHIN A REGION OF THE DISPLAY DEVICE

(71) Applicant: SAMSUNG ELECTRONICS CO., LTD., Suwon-si (KR)

(72) Inventors: Eungsik Yoon, Suwon-si (KR); Hyunkyu Yun, Suwon-si (KR); Heeseok Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/892,494

(22) Filed: Aug. 22, 2022

(65) Prior Publication Data

US 2023/0067768 A1  Mar. 2, 2023

Related U.S. Application Data

(63) Continuation of application No. PCT/KR2022/007913, filed on Jun. 3, 2022.

(30) Foreign Application Priority Data

Sep. 1, 2021  (KR) .......................... 10-2021-0116045

(51) Int. Cl.
*G09G 3/20* (2006.01)
(52) U.S. Cl.
CPC ..... *G09G 3/2092* (2013.01); *G09G 2330/022* (2013.01); *G09G 2350/00* (2013.01); *G09G 2370/045* (2013.01); *G09G 2370/16* (2013.01)
(58) Field of Classification Search
CPC .................................................. G09G 3/2092
See application file for complete search history.

(56) References Cited

U.S. PATENT DOCUMENTS 10,291,460 B2   5/2019  Zhang et al.
2017/0354349 A1  12/2017  Mohapatra et al.
(Continued)

FOREIGN PATENT DOCUMENTS

CN       103826241       5/2014
CN       106604394       4/2017
(Continued)

OTHER PUBLICATIONS

Ma et al., "WiFi Sensing with Channel State Information: A Survey", College of William & Mary, Computer Science Department, ACM Comput. Surv., vol. 52, No. 3, Article 46. Publication date: Jun. 2019, 36 pages.
(Continued)

*Primary Examiner* — Gustavo Polo
(74) *Attorney, Agent, or Firm* — Nixon & Vanderhye P.C.

(57) ABSTRACT

A display device and a method of controlling the same are provided. The display device may include: a communicator comprising communication circuitry configured to receive a wireless signal transmitted by a wireless router, a memory configured to store one or more instructions, and a processor configured to execute the one or more instructions stored in the memory, wherein the processor may be configured to continuously retrieve multipath channel characteristic data based on the wireless signal, perform preprocessing on the retrieved multipath channel characteristic data of the wireless signal, determine representative values for each reference time by calculating a similarity for each time period of result data corresponding to a result of the preprocessing, determine a motion within a specified region of the display device, based on a change in the representative values over time, and control the display device based on the determined motion within the specified region of the display device.

20 Claims, 15 Drawing Sheets

(56) References Cited

U.S. PATENT DOCUMENTS

2019/0166030 A1    5/2019    Chen et al.
2021/0091866 A1    3/2021    Zhang et al.

FOREIGN PATENT DOCUMENTS

| | | |
|---|---|---|
| JP | 2019-133639 | 8/2019 |
| JP | 2020-144115 | 9/2020 |
| KR | 10-2016-0014915 | 2/2016 |
| KR | 10-2016-0052319 | 5/2016 |
| KR | 10-2017-0042613 | 4/2017 |
| WO | 2020/240526 | 12/2020 |

OTHER PUBLICATIONS

International Search Report for PCT/KR2022/007913 dated Sep. 8, 2022, 3 pages.

DISPLAY DEVICE AND METHOD FOR CONTROLLING THE SAME BASED ON DETERMINED MOTION WITHIN A REGION OF THE DISPLAY DEVICE

CROSS-REFERENCE TO RELATED APPLICATIONS

This application is a continuation of International Application No. PCT/KR2022/007913 designating the United States, filed on Jun. 3, 2022, in the Korean Intellectual Property Receiving Office and claiming priority to Korean Patent Application No. 10-2021-0116045, filed on Sep. 1, 2021, in the Korean Intellectual Property Office, the disclosures of which are incorporated by reference herein in their entireties.

BACKGROUND

1. Field

The disclosure relates to a display device and method of controlling the same.

2. Description of Related Art

Recently, a display device may provide various network environments, such as wired Ethernet, a wireless local area network (LAN), and Bluetooth. A user of the display device may connect to the Internet or to a surrounding device, and may display content of the surrounding device on the display device. The wireless LAN may provide a wireless fidelity (Wi-Fi) function. Channel state information (CSI) of Wi-Fi may represent a channel frequency response by an orthogonal frequency division multiplexing (OFDM) subcarrier, and may include information on deformation of a signal between transmitting and receiving, such as decay, diffraction, and reflection.

SUMMARY

According to various example embodiments, a display device includes: a communicator comprising communication circuitry configured to receive a wireless signal transmitted by a wireless router, a memory configured to store one or more instructions, and a processor configured to execute the one or more instructions stored in the memory, wherein the processor may be configured to: continuously retrieve multipath channel characteristic data based on the wireless signal, perform preprocessing on the retrieved multipath channel characteristic data of the wireless signal, determine representative values for each reference time by calculating a similarity for each time period of result data corresponding to a result of the preprocessing, determine a motion within a specified region of the display device based on a change in the representative values over time, and control the display device based on the determined motion within the specified region of the display device.

According to various example embodiments, a method of controlling a display device includes: retrieving multipath channel characteristic data based on a wireless signal transmitted by a wireless router, performing preprocessing on the retrieved multipath channel characteristic data of the wireless signal, determining representative values for each reference time by calculating a similarity for each time period of result data corresponding to a result of the preprocessing, determining a motion within a specified region of the display device based on a change in the representative values over time, and controlling the display device based on the determined motion within the specified region of the display device.

According to various example embodiments, a display device includes: a memory configured to store one or more instructions, and a processor configured to execute the one or more instructions stored in the memory, wherein the processor is configured to: continuously retrieve multipath channel characteristic data based on a wireless signal transmitted by a wireless router, perform preprocessing on the retrieved multipath channel characteristic data of the wireless signal, determine representative values for each reference time by calculating a similarity for each time period of result data corresponding to a result of the preprocessing, determine a motion around a display device based on a comparison result between the representative values and an adaptive threshold, and control a power mode of the display device based on the determined motion around the display device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
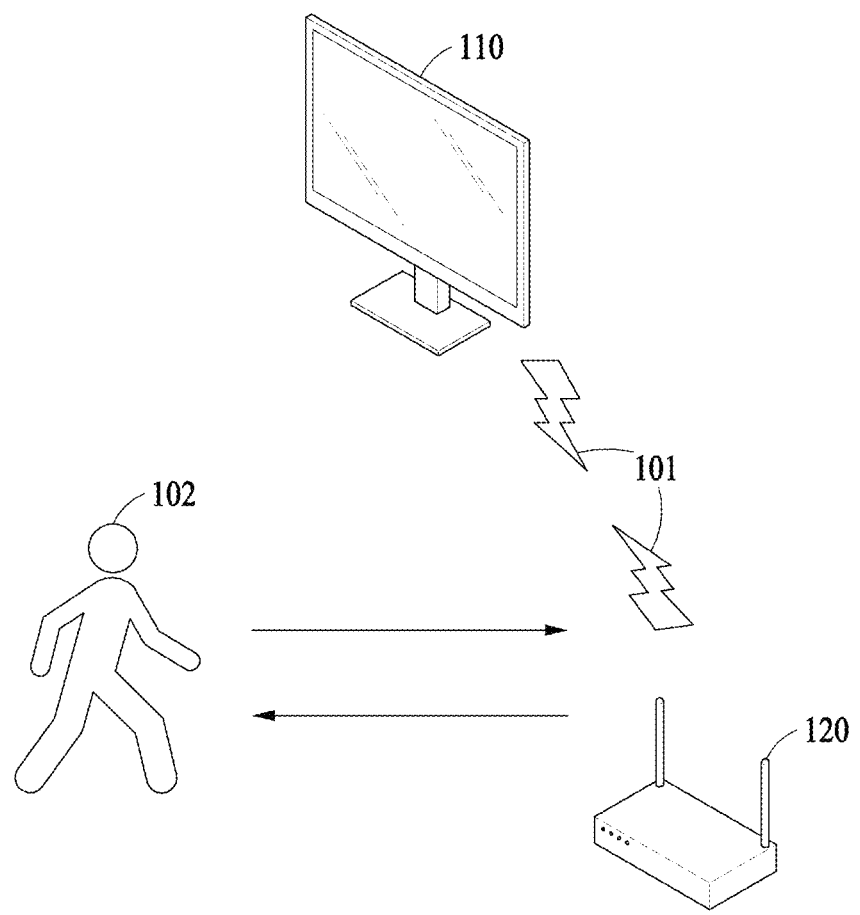
FIG. 1 is a diagram illustrating an example of a communication environment between a display device and a wireless router according to various embodiments.

Hereinafter, various example embodiments will be described in greater detail with reference to the accompanying drawings. When describing the example embodiments with reference to the accompanying drawings, like reference numerals refer to like elements and a repeated description related may not be provided.

When a display device operates even in case no user is present around the display device, unnecessary power consumption may occur.

According to various example embodiments, a display device may minimize and/or reduce power consumption by controlling a power mode of the display device based on a motion around the display device.

FIG. 1 is a diagram illustrating an example of a communication environment between a display device 110 and a wireless router 120 according to various embodiments. Referring to FIG. 1, a wireless router 120 may be located near a display device 110, and wireless communication may be performed between the display device 110 and the wireless router 120 through a wireless signal 101. The wireless router 120 may include wired Internet connection, and may connect the display device 110 to the Internet using wired Internet connection and wireless communication connection. The wireless communication may include wireless fidelity (Wi-Fi), and the wireless signal 101 may be a Wi-Fi signal.

The display device 110 may retrieve multipath channel characteristic data based on the wireless signal 101, and may control the display device 110 using the multipath channel characteristic data. The multipath channel characteristic data may represent a channel status characteristic of a multipath. For example, the multipath channel characteristic data may include channel status information (CSI) data. The display device 110 may measure a motion around the display device 110 using the multipath channel characteristic data, and may control the display device 110 based on the measured motion. For example, when there is no motion around the display device 110, the display device 110 may set a power mode of the display device 110 to a power saving mode.

In case a user 102 uses the display device 110, for example, the user 102 is watching video content on the display device 110, a motion may be detected around the display device 110. On the other hand, in case the user 102 does not use the display device 110, a motion around the display device 110 may not be detected. In this case, unnecessary power consumption may be reduced by operating the display device 110 in the power saving mode or shutting off the power of the display device 110. For example, the power saving mode may include at least one of reducing brightness of a screen of the display device 110, reducing a volume level of the display device 110, turning off the screen of the display device 110, muting the sound of display device 110, and shutting off the power of the display device 110.

Figure 2:
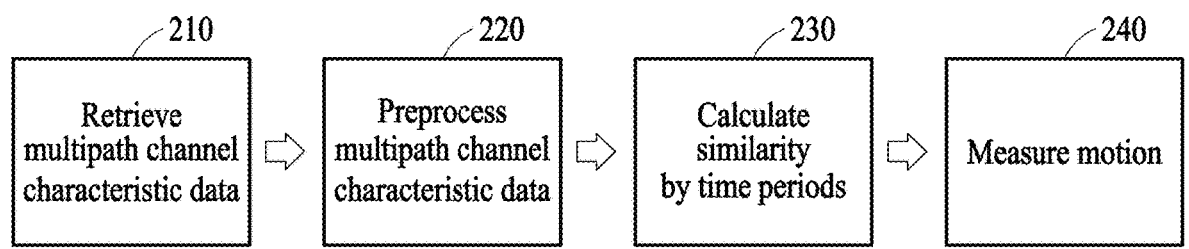
FIG. 2 is a diagram illustrating an example operation related to measuring a motion using multipath channel characteristic data, according to various embodiments.

FIG. 2 is a diagram illustrating an example operation related to measuring a motion using multipath channel characteristic data, according to various embodiments. Referring to FIG. 2, in operation 210, a display device (for example, the display device 110, a display device 1100, and a display device 1200) may retrieve multipath channel characteristic data. The display device may retrieve the multipath channel characteristic data based on a wireless signal transmitted by a wireless router (for example, the wireless router 120). The wireless signal may be a Wi-Fi signal. The multipath channel characteristic data may represent a channel frequency response by an orthogonal frequency division multiplexing (OFDM) subcarrier. The display device may retrieve the multipath channel characteristic data from a response signal of the wireless router to a response request signal of the display device, and may extract an amplitude for a frequency of each subcarrier from the multipath channel characteristic data.

In operation 220, the display device may perform preprocessing on the multipath channel characteristic data. For example, the preprocessing may include at least one of removing a data gap of a frequency, which does not have an amplitude value, among the frequencies of subcarriers, and removing an outlier from amplitude data.

In operation 230, the display device may calculate a similarity for each time period of the multipath channel characteristic data based on amplitude data for each frequency of a subcarrier based on the multipath channel characteristic data. The multipath channel characteristic data may be divided by time periods, and the similarity by the time periods may represent a similarity between multipath channel characteristic data of adjacent periods. For example, the similarity by the time periods may include an autocorrelation function (ACF). In case the preprocessing is performed through operation 220, the display device may calculate a similarity based on a result of the preprocessing. The display device may determine representative similarity values for each reference time through similarity calculation. Here, the reference time may correspond to one of sampling time points (for example, a time point when a response signal is received) of the multipath channel characteristic data.

For example, the display device may determine a first similarity value of a first frequency at a W+1-th time point by calculating a similarity between first amplitude data of the first frequency at a first time point to a W-th time point within a first window and second amplitude data of the first frequency at a second time point to the W+1-th time point within a second window. The display device may determine similarity values of other frequencies, such as a second frequency, in a similar manner. The display device may determine a representative similarity value at the W+1-th time point, based on the first similarity value of the first frequency at the W+1-th time point and a second similarity value of the second frequency at the W+1-th time point. For example, the representative similarity value may correspond to a statistical value (for example, an average value) of the similarity values. The display device may determine representative similarity values at other time points, such as a W+2-th time point, in a similar manner.

In operation 240, the display device may measure a motion around the display device. The display device may measure the motion based on a comparison result between the representative similarity values and a threshold. For example, the display device may determine that there is a motion in a period in which the representative similarity value is greater than the threshold, and may determine that there is no motion in a period in which the representative similarity value is less than the threshold. The display device may adaptively adjust the threshold based on a distribution of the representative similarity values. The display device may control the display device based on the measured motion.

Figure 3:
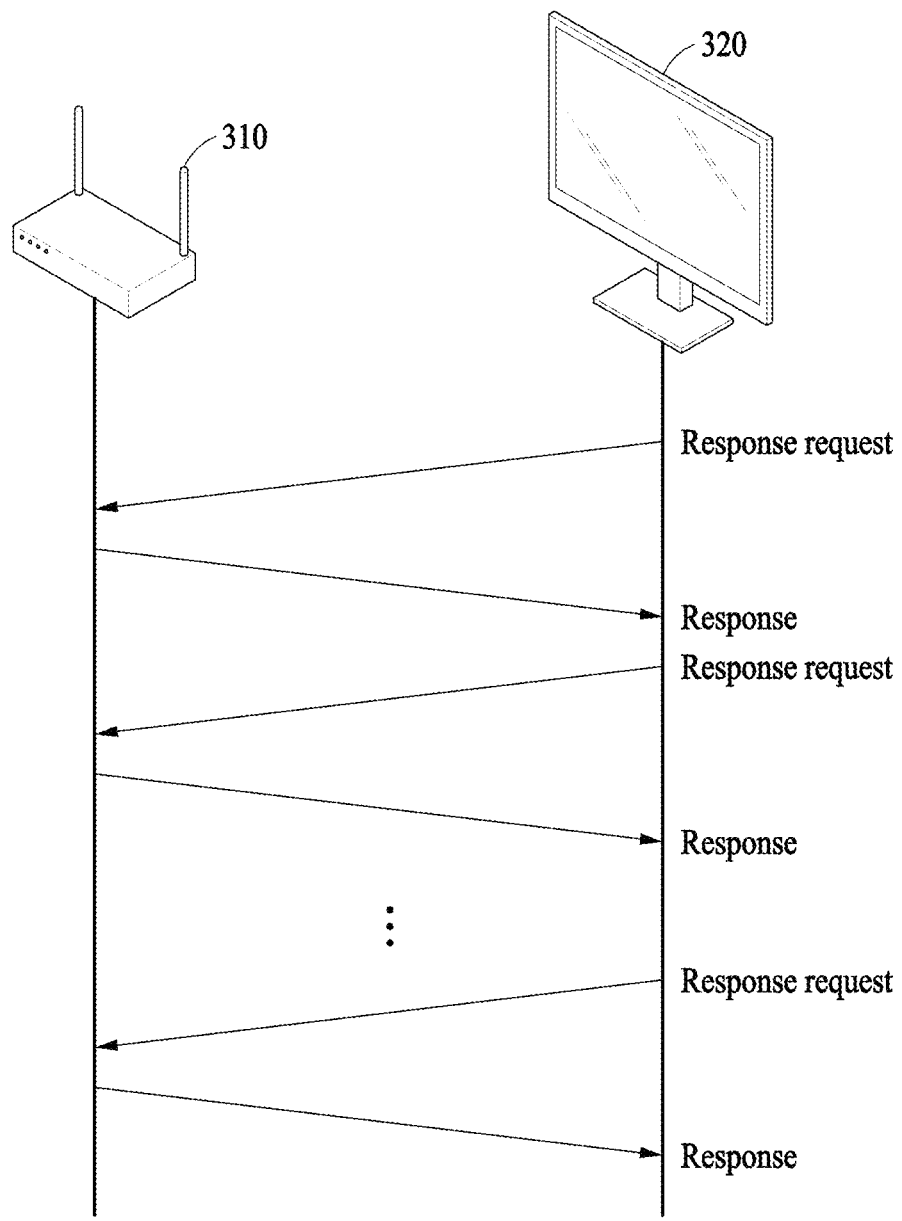
FIG. 3 is a diagram illustrating an example operation of retrieving multipath channel characteristic data, according to various embodiments.

FIG. 3 is a diagram illustrating an example operation of retrieving multipath channel characteristic data, according to various embodiments. Referring to FIG. 3, a display device 320 may transmit a response request signal to a wireless router 310, and the wireless router 310 may transmit a response signal to the display device 320, in response to the response request signal. The display device 320 may correspond to the display device 110, the display device 1100, and the display device 1200, and the wireless router 310 may correspond to the wireless router 120. The display device 320 may retrieve multipath channel characteristic data based on the response signal.

Figure 4:
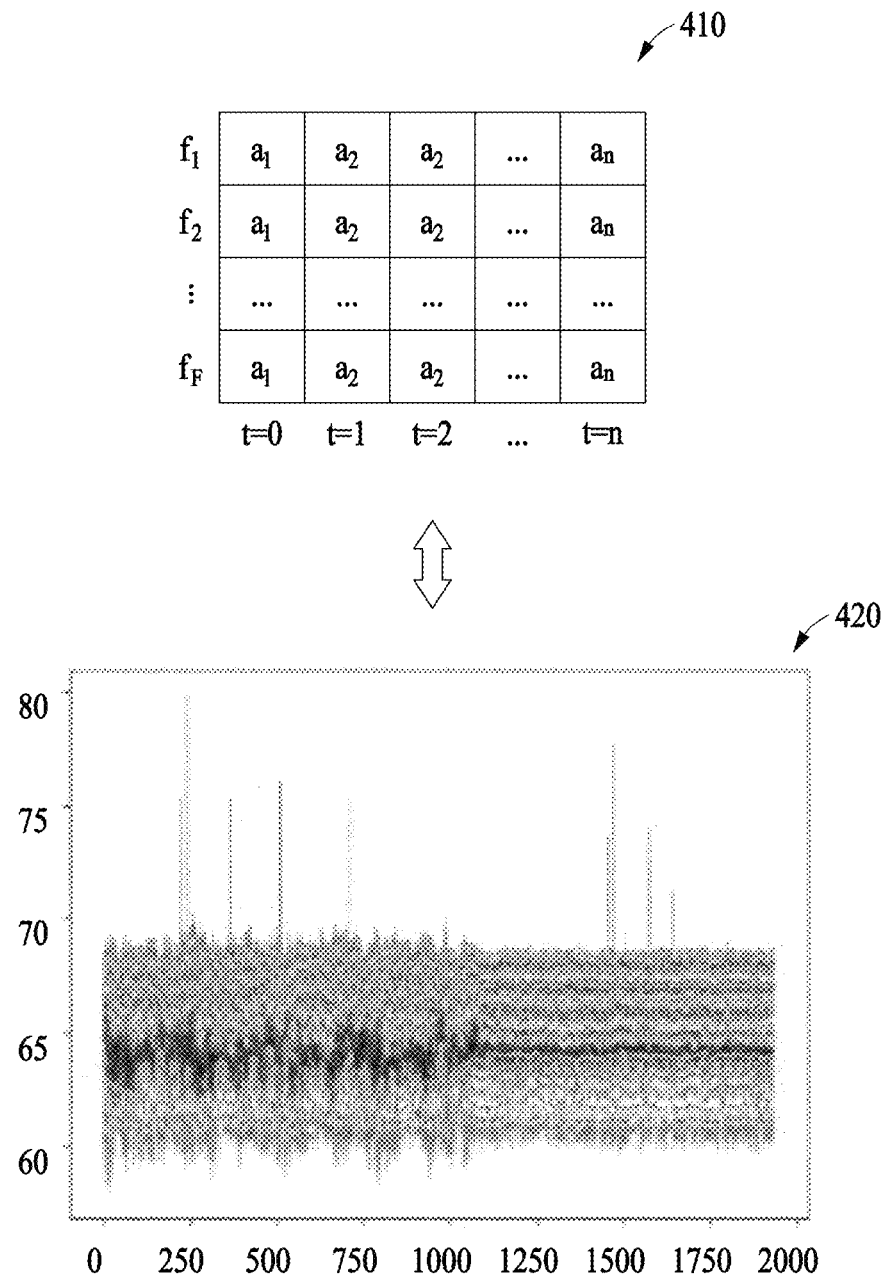
FIG. 4 is a diagram illustrating an example of amplitude data based on multipath channel characteristic data according to various embodiments.

FIG. 4 is a diagram illustrating an example of amplitude data based on multipath channel characteristic data according to various embodiments. The amplitude data may represent an amplitude for a frequency at each reference time. A display device (for example, the display device 110, the display device 1100, and the display device 1200) may retrieve the multipath channel characteristic data at each reference time, and may generate the amplitude data by extracting an amplitude for each frequency from the multipath channel characteristic data. The amplitude data may have a data structure as shown in Table 410. For example, $f_i$ may denote a frequency of a subcarrier having an index i, n may denote a size of a window for calculating a similarity, and a may denote an amplitude. For example, i may have a value between 1 to F. F may denote a total number of subcarriers. For example, t may denote a reference time. For example, $a_1$ may denote an amplitude of multipath channel characteristic data retrieved at a reference time t=0. The amplitude data may be represented by graph 420. In graph 420, the horizontal axis may represent time and the vertical axis may represent amplitude. In graph 420, each frequency may be discriminated from another by color.

Figure 5:
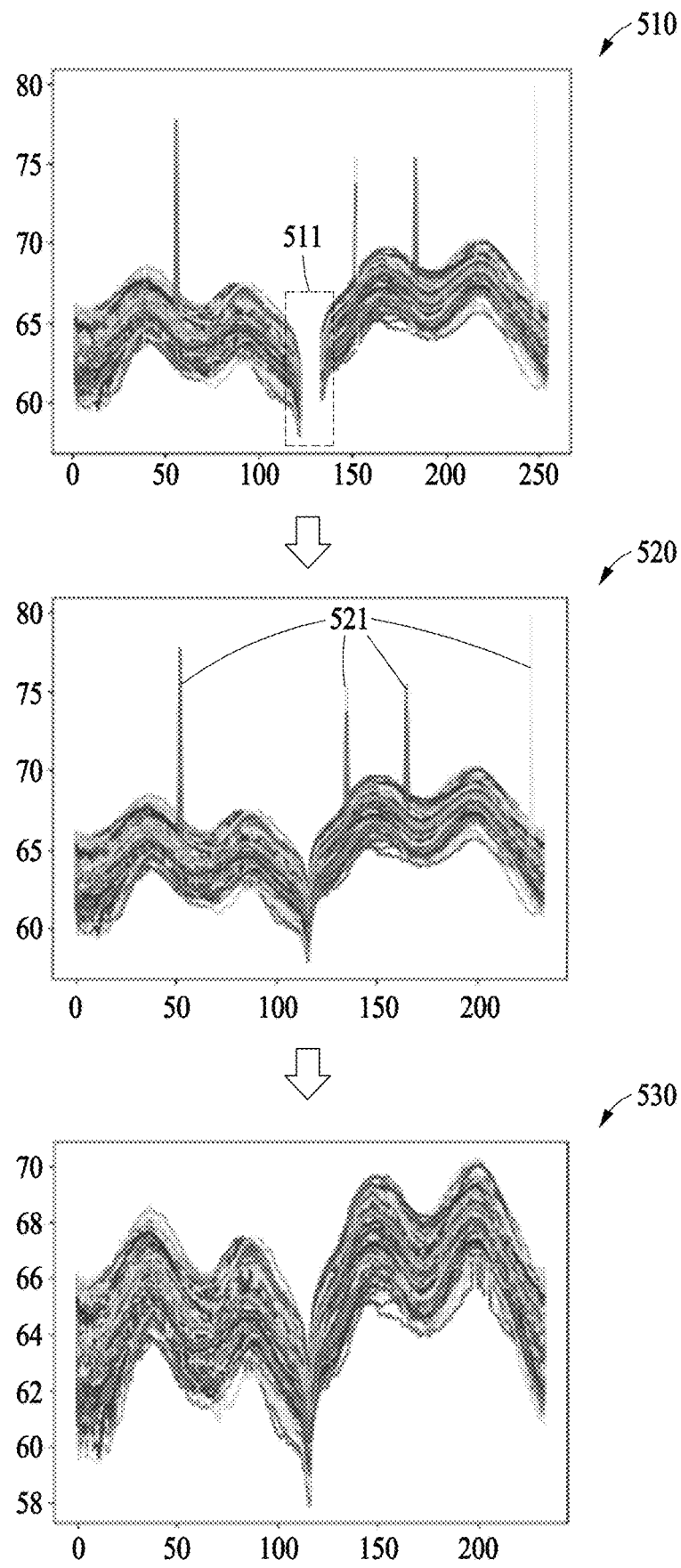
FIG. 5 is a diagram an example result of preprocessing on multipath channel characteristic data according to various embodiments.

FIG. 5 is a diagram including graphs illustrating an example result of preprocessing on multipath channel characteristic data according to various embodiments. Referring to FIG. 5, graphs 510, 520 and 530 (which may be referred to as graphs 510 to 530) may represent amplitude data according to preprocessing. In graphs 510 to 530, the horizontal axis may represent time and the vertical axis may represent amplitude. Amplitude data shown in graph 520 may be derived by removing a data gap 511 from amplitude data shown in graph 510, and amplitude data shown in graph 530 may be derived by removing an outlier 521 from the amplitude data shown in graph 520. Only one of removing the data gap 511 and removing the outlier 521 may be performed.

Graph 510 may represent raw amplitude data of a frequency domain. Graph 420 of FIG. 4 may represent raw amplitude data of a frequency domain. Graph 510 may be obtained by converting the amplitude data shown in graph 420 into a frequency domain. The amplitude data may include the data gap 511, as shown in graph 510. The data gap 511 may represent a phenomenon in which there is no amplitude value in a predetermined frequency band. The data gap 511 may occur in a predetermined frequency band based on a characteristic (for example, a modulation method) of a wireless router (for example, the wireless router 120). The data gap 511 may decrease the accuracy of measuring a motion. The display device (for example, the display device 110, the display device 1100, and the display device 1200) may remove the data gap 511 through a preprocessing operation, and may improve the accuracy of motion measurement by calculating a similarity using amplitude data of which the data gap 511 has been removed.

The display device may detect the data gap 511 by scanning a frequency band of total subcarriers, and may remove the data gap 511 by adjusting a disposition of an amplitude value. For example, FIG. 5 illustrates an example that 256 OFDM subcarriers are used, and the data gap 511 has occurred in a frequency band of which a frequency index is 120 to 130. The display device may detect the data gap 511 in the frequency band, and may remove the data gap 511 using an amplitude value of another frequency band. For example, the display device may remove the data gap 511 by shifting an amplitude value of a frequency band of which a frequency index is 130 to 256. Accordingly, the data gap 511 may be replaced with an amplitude value of an adjacent frequency band (for example, a frequency band of which a frequency index is 130 to 140).

Graph 520 may represent a state in which the data gap 511 has been removed. The number of subcarriers in which the amplitude data is distributed may decrease as the data gap 511 has been removed. In other words, the number of subcarriers as a result of preprocessing (for example, graph 520 or graph 530) may be less than the number of subcarriers of multipath channel characteristic data (for example, graph 510) before preprocessing.

As shown in graph 520, the amplitude data may include the outlier(s) 521. The outlier 521 may be removed during a preprocessing process. For example, the outlier 521 may be removed through a Hampel filter. However, the Hampel filter is an example, and other filters may be used. Graph 530 may represent a state in which the outlier 521 has been removed.

Figure 6:
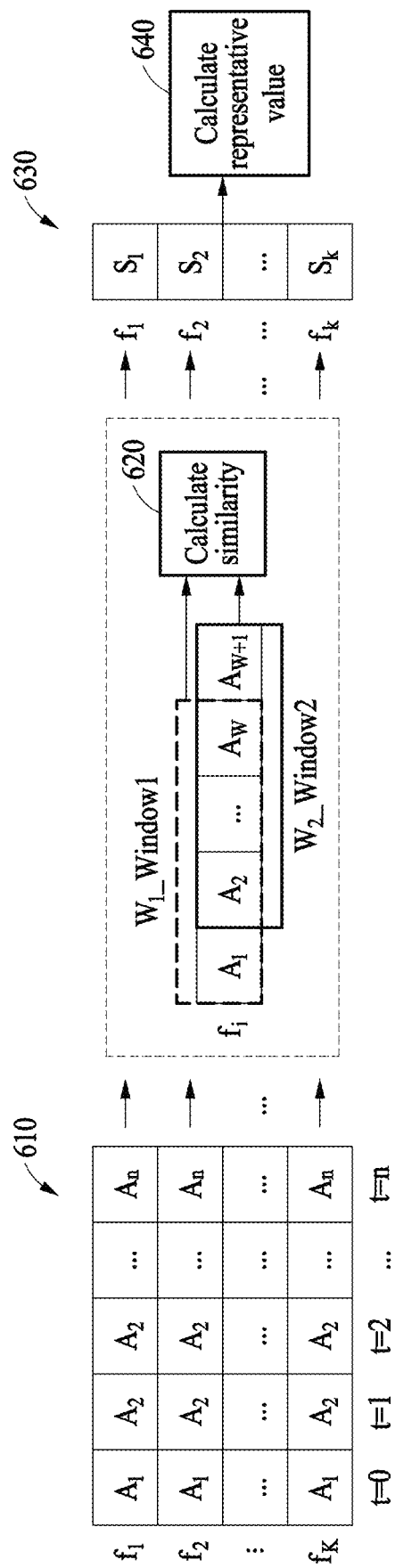
FIG. 6 is a diagram illustrating an example operation of deriving representative similarity value, according to various embodiments.

FIG. 6 is a diagram illustrating an example operation of deriving representative similarity values, according to various embodiments. Referring to FIG. 6, similarity values 630 may be derived by operation 620 of calculating a similarity based on amplitude data 610. In the amplitude data 610, A may denote an amplitude and k may denote a total number of subcarriers. The amplitude data 610 may correspond to a result of preprocessing, and in case a data gap is removed through preprocessing, k may be less than F. As described above with reference to FIG. 4, F may denote a total number of subcarriers before preprocessing.

The similarity values 630 of each frequency with respect to a W+1-th reference time may be derived by performing operation 620 on each of the frequencies of the amplitude data 610 at the W+1-th reference time. Each frequency may be represented by $f_i$. For example, i may have a value between 1 to k. For i-th amplitude data of $f_i$, a first window $W_1$ and a second window $W_2$ may be defined, and an i-th similarity value Si may be determined through operation 620 between amplitude data $A_1$ to $A_W$ of the first window $W_1$ and amplitude data $A_2$ to $A_{W+1}$ of the second window $W_2$.

As described with reference to FIG. 4, n may denote a size of a window for operation 620 of calculating a similarity. When n+1 times of data retrieval have performed before operation 620, amplitude data $A_1$ to $A_n$ of $f_i$ may configure the amplitude data $A_1$ to $A_W$ of the first window $W_1$, and amplitude data $A_2$ to $A_{n+1}$ may configure the amplitude data $A_2$ to $A_{W+1}$ of the second window $W_2$. By performing operation 620 between the amplitude data $A_1$ to $A_W$ of $f_i$ and the amplitude data $A_2$ to $A_{W+1}$ of $f_i$, the i-th similarity value $S_i$ at the W+1-th reference time may be determined.

As the first similarity value $S_i$ at the W+1-th reference time to a k-th similarity value $S_k$ at the W+1-th reference time are determined, operation 640 of calculating a representative value may be performed based on a statistical value of the similarity values $S_i$ to $S_k$. For example, based on an average value of the similarity values $S_i$ to $S_k$ at the W+1-th reference time, a representative similarity value at the W+1-th reference time may be determined. Through the operations, a representative similarity value for each reference time may be determined.

Figure 7:
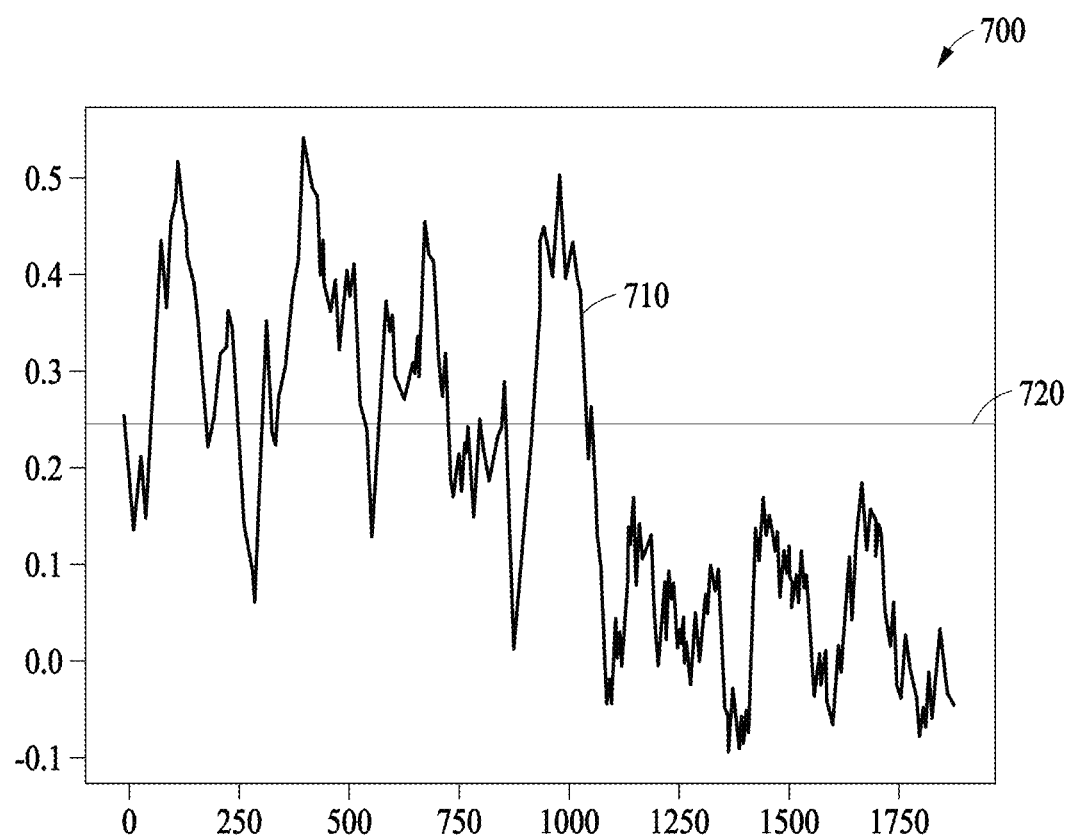
FIG. 7 is a graph illustrating an example operation of measuring a motion, according to various embodiments.

FIG. 7 is a graph illustrating an example operation of measuring a motion, according to various embodiments. Referring to FIG. 7, representative similarity values 710 and a threshold 720 are shown on graph 700. In graph 700, the horizontal axis may represent time and the vertical axis may represent a similarity value. The representative similarity values 710 may vary over time. A motion around a display device (for example, the display device 110, the display device 1100, and the display device 1200) may change a pattern of multipath channel characteristic data, and the representative similarity values 710 may increase thereby. The display device may measure the motion based on a comparison result between the representative similarity values 710 and the threshold 720. For example, the display device may determine that there is a motion in a period in which the representative similarity values 710 are greater than the threshold 720, and may determine that there is no motion in a period in which the representative similarity values 710 are less than the threshold 720. The threshold 720 may be adaptively adjusted depending on an installation environment or a surrounding condition.

Figure 8:
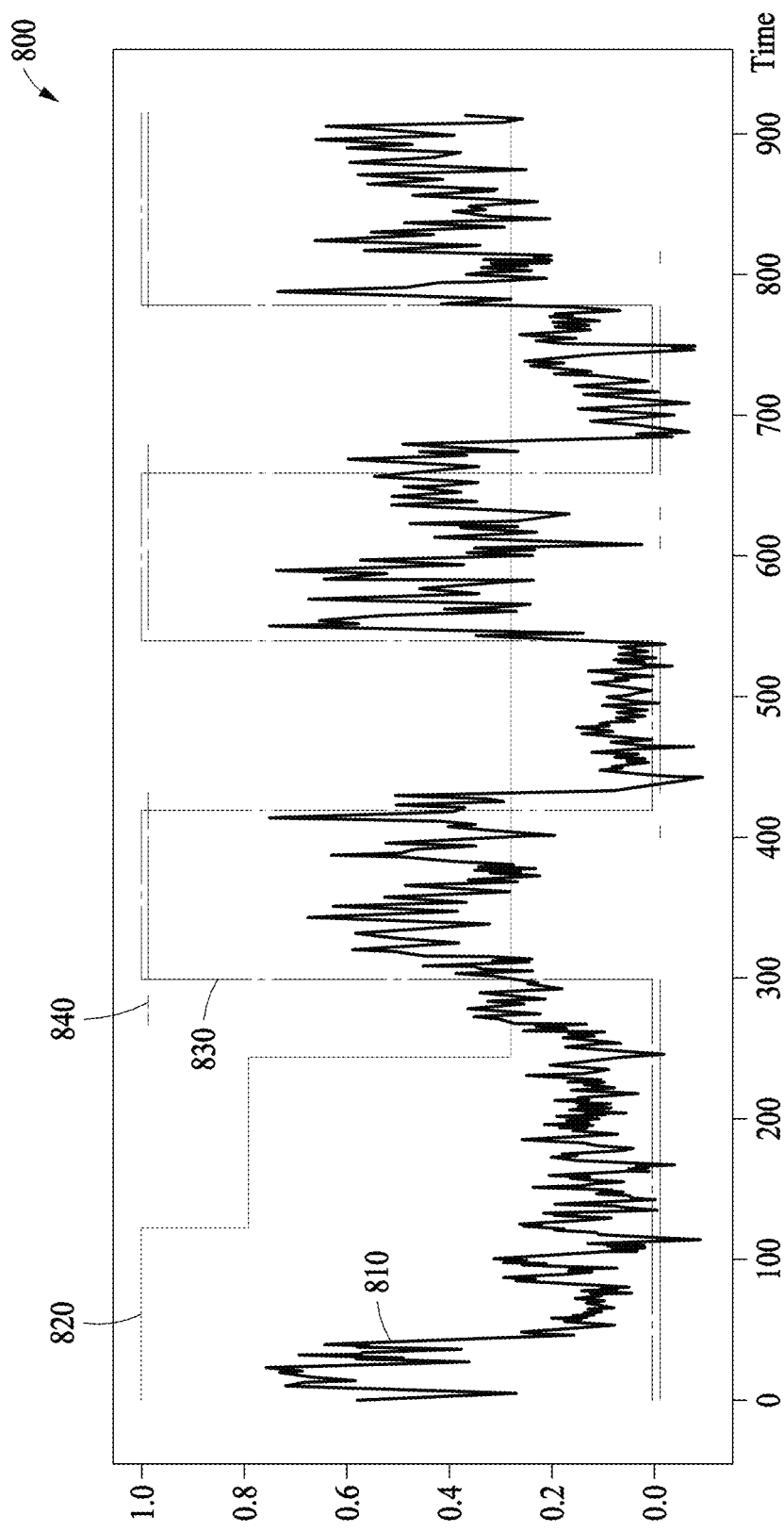
FIG. 8 is a graph illustrating an example of an adaptively adjusted threshold, according to various embodiments.

FIG. 8 is a graph illustrating an example of a threshold that is adaptively adjusted, according to various embodiments. Referring to FIG. 8, representative similarity values 810, a threshold 820, ground truth (GT) data 830, and a measurement result 840 may be displayed on graph 800. In graph 800, the horizontal axis may represent time and the vertical axis may represent a similarity value. The multipath channel characteristic data may represent a different characteristic, based on a use environment and a situation of a display device (for example, the display device 110, the display device 1100 (refer to FIG. 11), and the display device 1200 (refer to FIG. 12)) and a wireless router (for example, the wireless router 120), and thus, the display device may adaptively adjust the threshold 820, based on the use environment and the situation.

The threshold 820 may initially have a preset initial value, such as 1.0, and thereafter, the threshold 820 may be adjusted according to a distribution of the representative similarity values 810. For example, the display device may calculate an average value and a maximum value of the representative similarity values 810 of a corresponding time period at an adjustment interval (for example, one minute), and when the threshold 820 is greater than the average value, the display device may adjust the threshold 820 based on the maximum value. For example, the threshold 820 may be set to a value, which is greater than the maximum value by 10% of the maximum value. In the example shown in FIG. 8, the threshold 820 may be gradually adjusted to a smaller value according to the distribution of the representative similarity values 810 at an initial stage. Accordingly, the measurement result 840 corresponding to the GT data 830 may be derived.

Figure 9A:
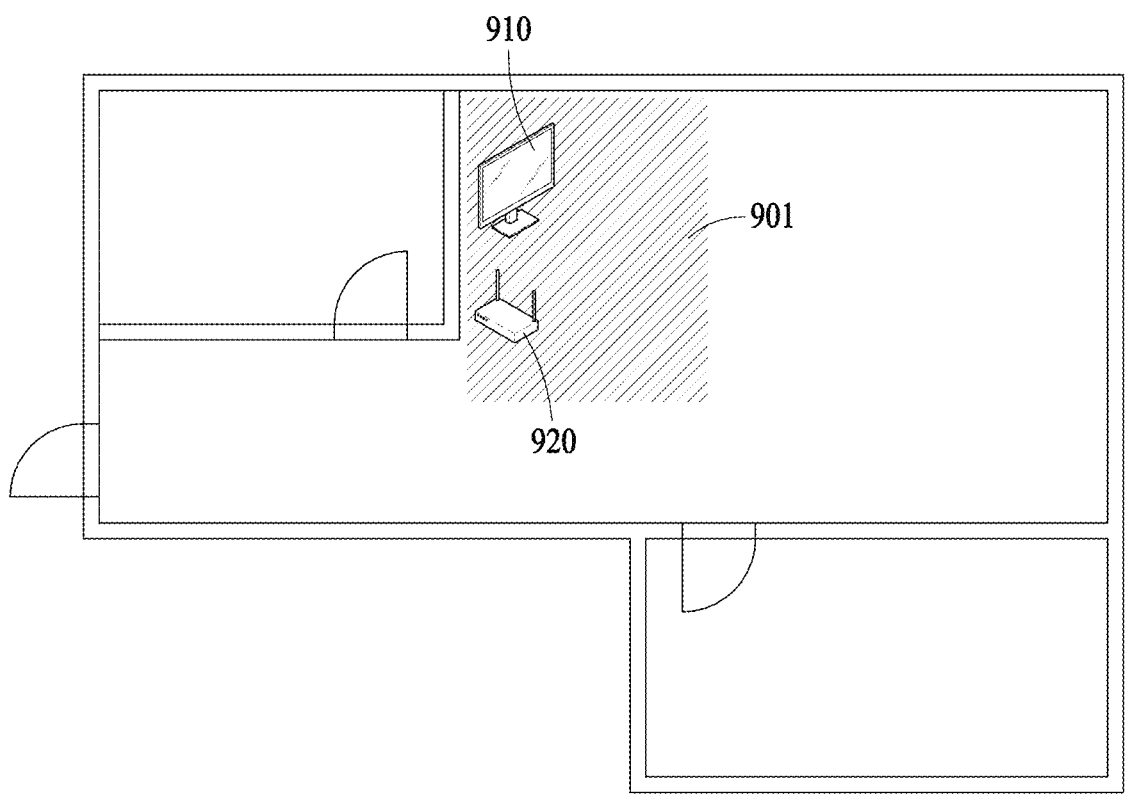
FIGS. 9A, 9B, 9C and 9D are diagrams illustrating examples of motion measuring ranges according to various embodiments.
Figure 9B:
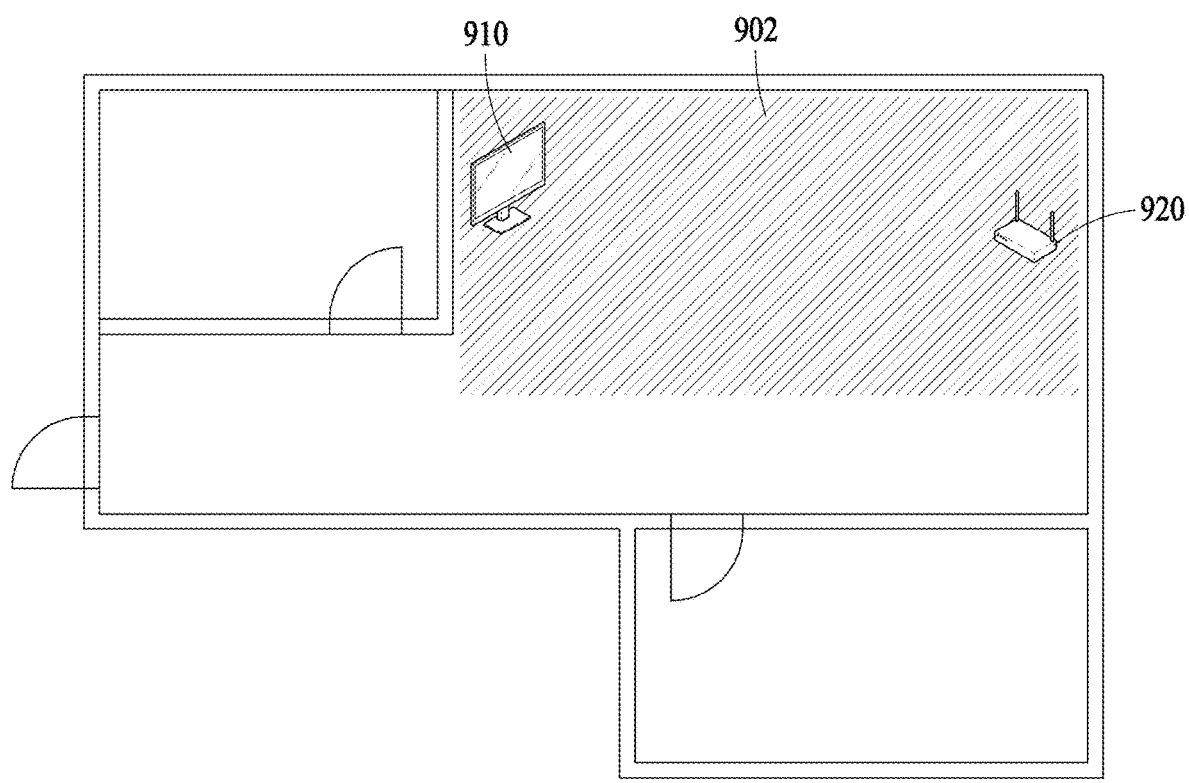
Figure 9C:
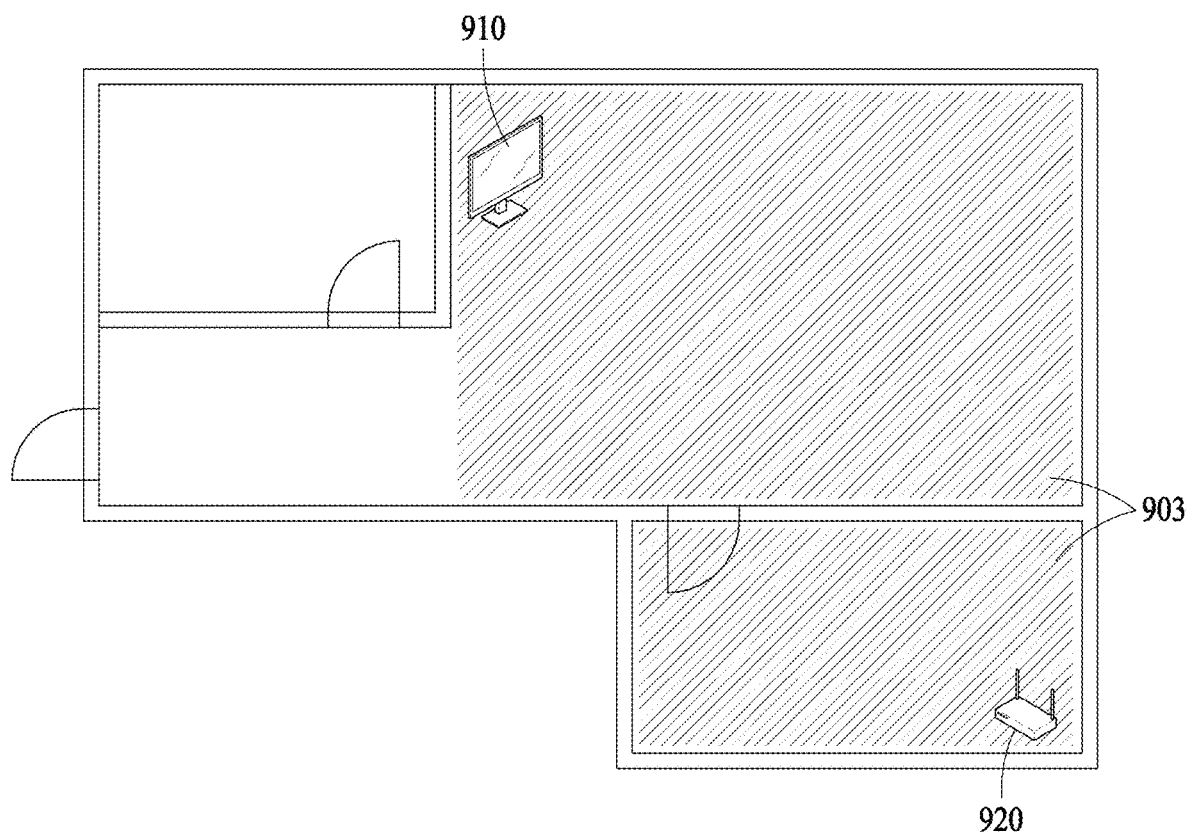
Figure 9D:
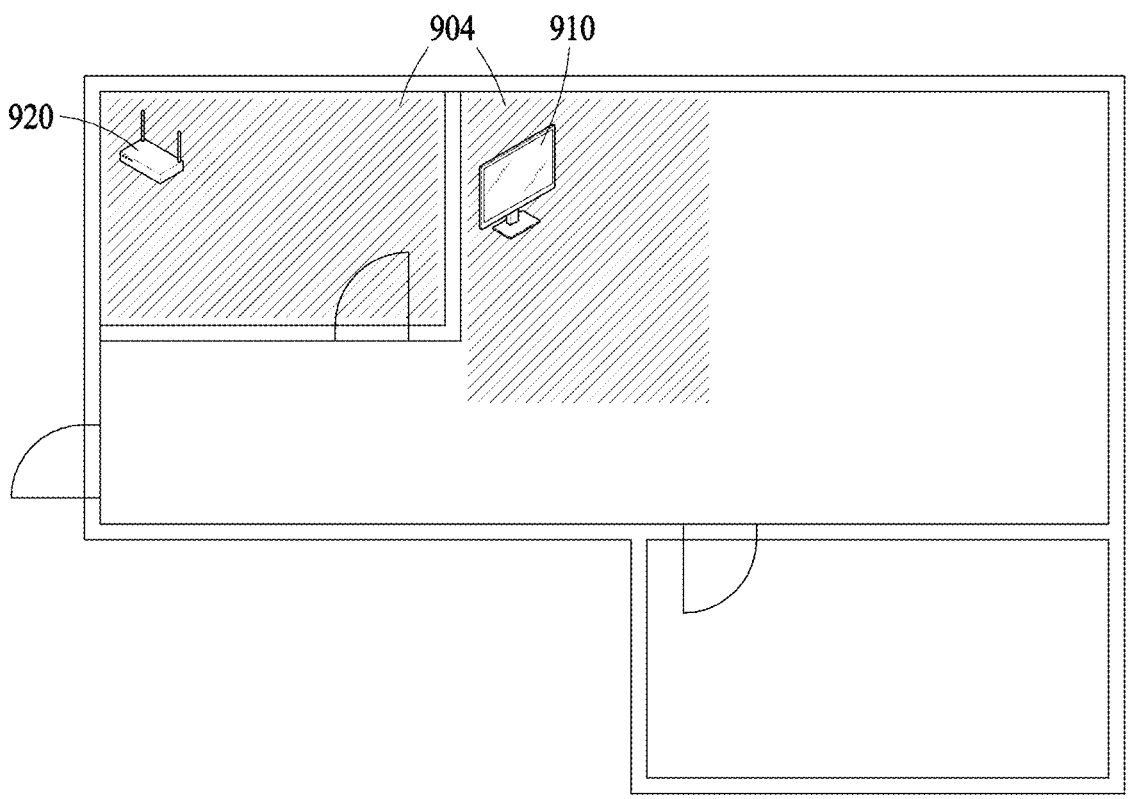

FIGS. 9A, 9B, 9C and 9D (which may be referred to as FIGS. 9A to 9D) are diagrams illustrating examples of motion measuring ranges according to various embodiments. Referring to FIGS. 9A to 9D, motion measuring ranges 901, 902, 903 and 904 (which may be referred to as ranges 901 to 904) may be illustrated based on a location of a display device 910 and a wireless router 920. The display device 910 may correspond to the display device 110, the display device 1100, and the display device 1200, and the wireless router 920 may correspond to the wireless router 120. FIG. 9A may represent an environment in which the wireless router 920 is installed on a side of the display device 910, FIG. 9B may represent an environment in which the wireless router 920 is installed in front of the display device 910, FIG. 9C may represent an environment in which the wireless router 920 is installed in a room in front of the display device 910, and FIG. 9D may represent an environment in which the wireless router 920 is installed in a room behind the display device 910. The motion measuring ranges 901 to 904 may be distributed in a space around the display device 910, a space around the wireless router 920, and a space between the display device 910 and the wireless router 920.

Figure 10:
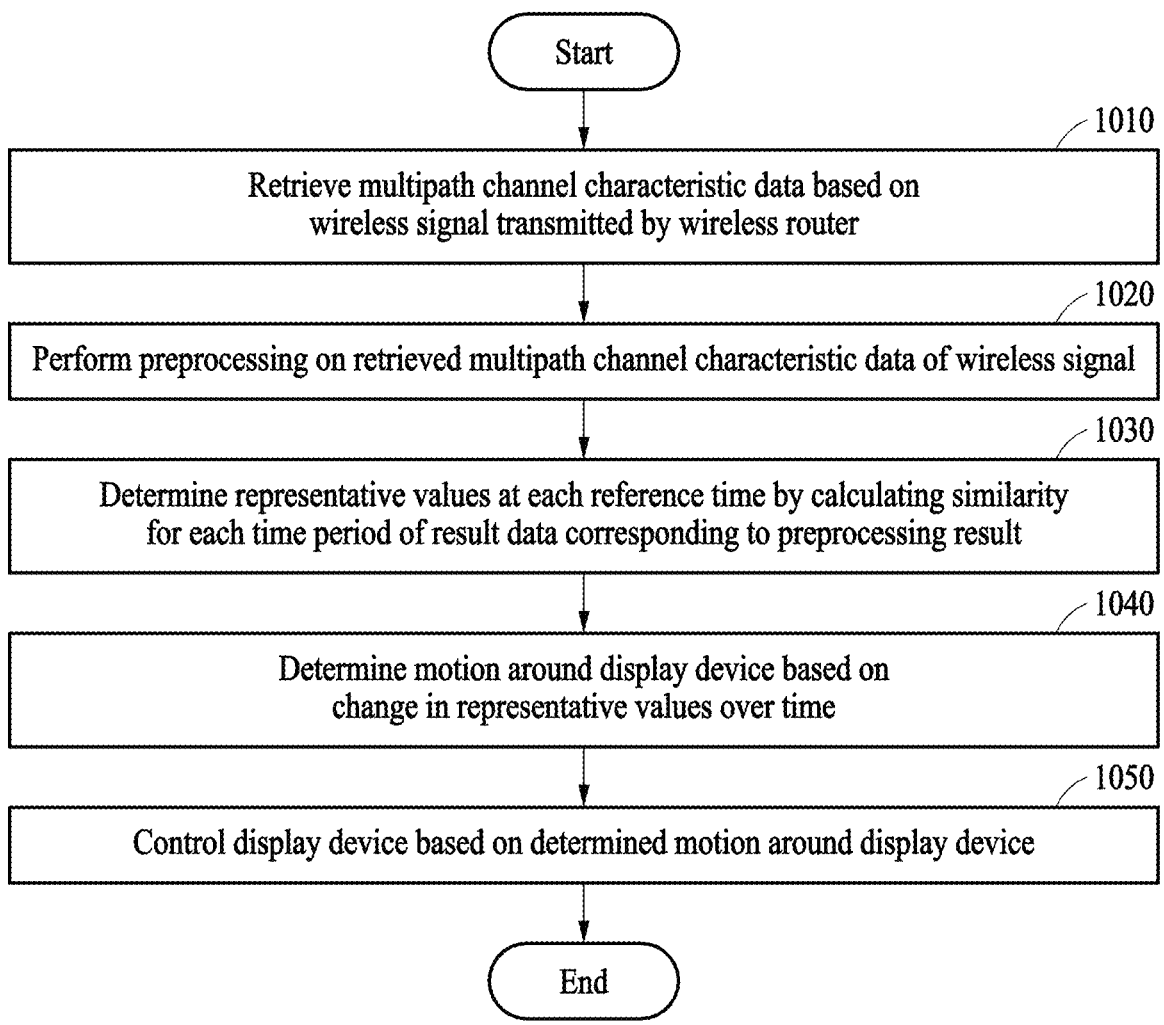
FIG. 10 is a flowchart illustrating an example method of controlling a display device, according to various embodiments.

FIG. 10 is a flowchart illustrating an example method of controlling a display device, according to various embodiments. Operations 1010 to 1040 of FIG. 10 may be performed sequentially or non-sequentially. For example, the order of operations 1010 to 1040 may be changed, and/or at least two of operations 1010 to 1040 may be performed in parallel. Operations 1010 to 1040 may be performed by at least one component (for example, a processor 1130 and a processor 1270) of a display device (for example, the display device 110, the display device 1100, and the display device 1200).

Referring to FIG. 10, in operation 1010, the display device may retrieve multipath channel characteristic data based on a wireless signal transmitted by a wireless router. In operation 1020, the display device may perform preprocessing on the multipath channel characteristic data of the retrieved wireless signal. Operation 1020 may include an operation of detecting a data gap in a first frequency band of the multipath channel characteristic data, and an operation of removing the data gap by replacing the data gap with an amplitude value of a second frequency band that is adjacent to the first frequency band. The number of subcarriers of result data corresponding to the preprocessing result may be less than the number of subcarriers of the multipath channel characteristic data before preprocessing. Operation 1020 may include an operation of removing an outlier from amplitude data.

In operation 1030, the display device may determine representative values at each reference time by calculating a similarity for each time period of the result data corresponding to the preprocessing result. Operation 1030 may include an operation of determining a first similarity value of a first frequency at a W+1-th time point by calculating a similarity between first amplitude data of the first frequency at a first time point to a W-th time point within a first window of the multipath channel characteristic data and second amplitude data of the first frequency at a second time point to the W+1-th time point within a second window. Operation 1030 may include an operation of determining a representative value at the W+1-th time point, based on the first similarity value of the first frequency at the W+1-th time point and a second similarity value of the second frequency at the W+1-th time point. The representative value at the W+1-th time point may be an average value, based on the first similarity value and the second similarity value.

In operation 1040, the display device may determine a motion around the display device based on a change in the representative values over time. Operation 1040 may include an operation of determining a motion based on a comparison result between the representative values and a threshold. The threshold may be adaptively adjusted depending on a distribution of the representative values.

In operation 1050, the display device may control the display device based on the determined motion around the display device. Operation 1050 may include an operation of operating the display device in a power saving mode when there is no motion around the display device for a predetermined time.

Figure 11:
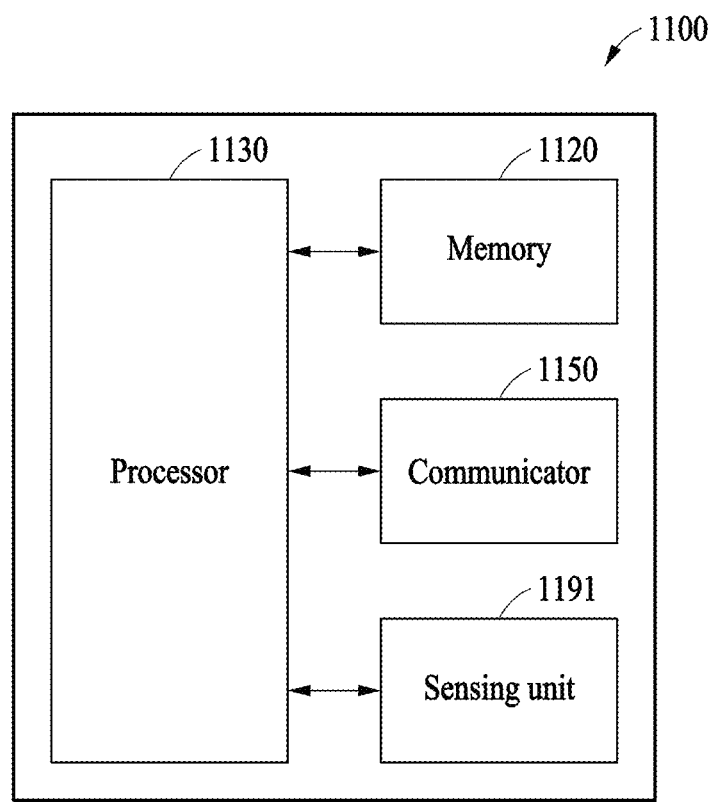
FIGS. 11 and 12 are block diagrams illustrating example configurations of example display devices according to various embodiments.
Figure 12:
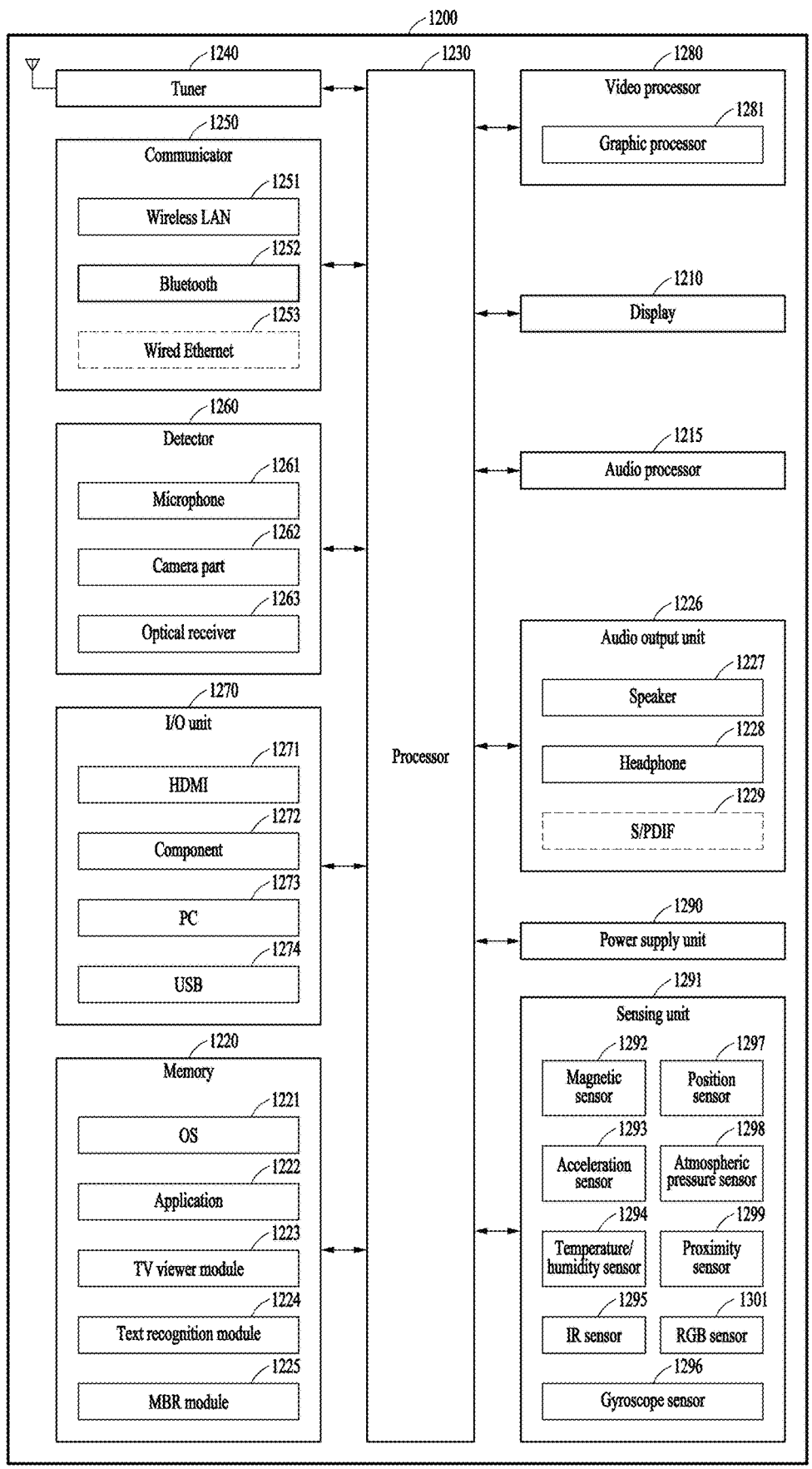

FIGS. 11 and 12 are block diagrams illustrating example configurations of display devices according to various embodiments. As shown in FIG. 11, the display device 1100 may include a memory 1120, the processor (e.g., including processing circuitry) 1130, a communicator (e.g., including communication circuitry) 1150, and a sensing unit (e.g., including sensing circuitry and/or a sensor) 1191. The communicator 1150 may include various communication circuitry and receive a wireless signal transmitted by a wireless router. According to various example embodiments, the processor 1130 may include various processing circuitry and continuously retrieve multipath channel characteristic data based on a wireless signal, may perform preprocessing on the multipath channel characteristic data of the retrieved wireless signal, may determine representative values for each reference time by calculating a similarity for each time period of result data corresponding to the preprocessing result, may determine a motion around the display device based on a change in the representative values over time, and may control the display device based on the determined motion around the display device.

The processor 1130 may detect a data gap in a first frequency band of multipath channel characteristic data, as a form of performing the preprocessing, and may remove the data gap by replacing the data gap with an amplitude value of a second frequency band that is adjacent to the first frequency band. The number of subcarriers of result data may be less than the number of subcarriers of the multipath channel characteristic data before preprocessing. As a form of performing the preprocessing, the processor 1130 may remove an outlier from the multipath channel measurement data.

The processor 1130 may determine a first similarity value of a first frequency at a W+1-th time point by calculating a similarity between first amplitude data of the first frequency at a first time point to a W-th time point within a first window of the multipath channel characteristic data and second amplitude data of the first frequency at a second time point to the W+1-th time point within a second window, and may determine a representative value at the W+1-th time point, based on the first similarity value of the first frequency at the W+1-th time point and a second similarity value of a second frequency at the W+1-th time point. The representative value at the W+1-th time point may be an average value, based on the first similarity value and the second similarity value.

The processor 1130 may measure a motion based on a comparison result between the representative values and the threshold. The threshold may be adaptively adjusted depending on a distribution of the representative values. The processor 1130 may operate the display device in a power saving mode when there is no motion around the display device for a predetermined time.

According to various example embodiments, the processor 1130 may continuously retrieve multipath channel characteristic data based on a wireless signal that is transmitted by a wireless router, may perform preprocessing on the multipath channel characteristic data of the retrieved wireless signal, may determine representative values for each reference time by calculating a similarity for each time period of result data corresponding to the preprocessing result, may determine a motion around the display device, based on a comparison result between the representative values and an adaptive threshold, and may control a power mode of the display device based on the determined motion around the display device.

Not all components shown in FIG. 11 are essential components. The display device 1100 may be implemented by more components than the illustrated components, and the display device 1100 may be implemented by less components.

For example, as shown in FIG. 12, the display device 1200 may include a display 1210, a tuner 1240, a detector (e.g., including detecting circuitry) 1260, an input/output (I/O) unit (e.g., including input/output circuitry) 1270, a video processor (e.g., including video processing circuitry) 1280, an audio processor (e.g., including audio processing circuitry) 1215, an audio output unit (e.g., including audio output circuitry) 1226, and a power supply unit (e.g., including a power supply) 1290 as well as a memory 1220, the processor (e.g., including processing circuitry) 1230, a communicator (e.g., including communication circuitry) 1250, and a sensing unit (e.g., including various sensors) 1291.

Hereinafter, the components above mentioned are described in greater detail.

The processor 1230 may include various processing circuitry and control overall operations of the display device 1200 and a flow of a signal between internal components of the display device 1200, and may process data. The processor 1230 may execute various applications and an operation system (OS) stored in the memory 1220, in response to a user input or when a preset and stored condition is satisfied.

The processor 1230 may include random access memory (RAM) configured to store data or a signal input from the outside the display device 1200 or configured to be used as a storage corresponding to various tasks performed by the display device 1200, read-only memory (ROM) that stores a control program to control the display device 1200, and a processor.

The processor 1230 may include a graphics processing unit (GPU) (not shown) to process a graphic corresponding to a video. The processor 1230 may be implemented as a System on Chip (SoC) that integrates a core (not shown) and the GPU (not shown). The processor 1230 may include a single core, a dual core, a triple core, a quad core, and a multi core.

The processor 1230 may include a plurality of processors. For example, the processor may be implemented as a main processor (not shown) and a sub-processor (not shown) that operates in a sleep mode.

The processor 1230 may detect at least one sensed value corresponding to at least one sensor through the sensing unit 1291 including at least one sensor, by executing one or more instructions stored in the memory 1220.

The memory 1220 may store various pieces data, a program, or an application for driving and controlling the display device 1200 under control by the processor 1230. The memory 1220 may store data or input/output signals corresponding to driving of the video processor 1280, the display 1210, the audio processor 1215, the audio output unit 1226, the power supply unit 1290, the tuner 1240, the communicator 1250, the detector 1260, and the I/O unit 1270.

The memory 1220 may store an operating system 1221 for controlling the display device 1200 and the processor 1230, an application 1222 initially provided by a manufacturer or externally downloaded, a graphical user interface (GUI) related to the application, an object (for example, an image, text, an icon, a button, and the like) for providing the GUI, user information, a document, a database, and related data.

In addition, the memory 1220 may include a television (TV) viewer module 1223 including one or more instructions to receive an input signal from a remote control device (not shown) and thereby perform channel control corresponding to the input signal, or enter a channel scroll user interface mode when the input signal corresponds to a preset input, a text recognition module 1224 including one or more instructions to recognize information from content received from an external device (not shown), and a membrane bioreactor (MBR) module 1225 including one or more instructions to control a channel from an external device (not shown).

The memory 1220 may include ROM, RAM, a memory card (for example, a micro secure digital (SD) card and a universal serial bus (USB) memory, which are not shown) mounted to the display device 1200. In addition, the memory 1220 may include non-volatile memory, volatile memory, a hard disk drive (HDD), or a solid state drive (SSD).

The memory 1220 may include at least one type of storage media of a flash memory type, a hard disk type, a multimedia card micro type, a card memory type (for example, SD or extreme digital (XE) memory), RAM, static RAM, ROM, electrically erasable programmable ROM (EEPROM), programmable ROM (PROM), magnetic memory, a magnetic disk, and an optical disk.

The display 1210 may display a video included in a broadcast signal received through the tuner 1240 on a screen under control by the processor 1230. In addition, the display 1210 may display content (for example, a moving image) input through the communicator 1250 or the I/O unit 1270. The display 1210 may output an image stored in the memory 1220 under control by the processor 1230.

The display 1210 may generate a driving signal by converting an image signal, a data signal, an on-screen display (OSD) signal, and a control signal processed by the processor 1230. The display 1210 may be implemented as a plasma display panel (PDP), a liquid crystal display (LCD), an organic light-emitting diode (OLED), a cathode ray tube (CRT), and a flexible display, and in addition, the display 1210 may be implemented as a 3D display. In addition, the display 1210 may be used as an input device as well as an output device by being configured as a touchscreen.

The tuner 1240 may tune and select a frequency of a channel desired to be received by the display device 1200 among various radio wave elements through performing amplification, mixing, and resonance on a broadcast signal that is received by wire or wirelessly. The broadcast signal may include audio, a video, and additional information (for example, an electronic program guide (EPG)).

The tuner 1240 may receive the broadcast signal from a frequency band corresponding to a channel number according to a user input (for example, a control signal received from a remote control device (not shown), that is, a channel number input, an up-down input of a channel, and a channel input on an EPG screen).

The tuner 1240 may receive broadcast signals from various sources, such as terrestrial broadcast, cable broadcast, satellite broadcast, and Internet broadcast. The tuner 1240 may receive the broadcast signal from a source, such as analog broadcast or digital broadcast. The broadcast signal received by the tuner 1240 may be separated into audio, video, and/or additional information by decoding (for example, audio decoding, video decoding, or additional information decoding). The separated audio, video, and/or additional information may be stored in the memory 1220 under control by the processor 1230.

One or a plurality of tuners 1240 of the display device 1200 may be provided. The tuner 1240 may be implemented as all-in-one with the display device 1200, or implemented as a separate device (for example, a set-top box, which is not shown, and a tuner, which is not shown, connected to the I/O unit 1270) that includes a tuner electrically connected to the display device 1200.

The communicator 1250 may include various communication circuitry and connect the display device 1200 to an external device (for example, an audio device) (not shown) under control by the processor 1230. The processor 1230 may transmit/receive content to/from the external device (not shown) connected through the communicator 1250, may download an application from the external device (not shown), or may perform web browsing. The communicator 1250 may include one of a wireless local area network (LAN) 1251, Bluetooth 1252, and wired Ethernet 1253 corresponding to the performance and the structure of the display device 1200. In addition, the communicator 1250 may include a combination of the wireless LAN 1251, Bluetooth 1252, and the wired Ethernet 1253.

In addition, the communicator 1250 may receive a control signal of a remote control device (not shown) under control by the processor 1230. The control signal may be implemented as a Bluetooth type, a radio frequency (RF) signal type, or a Wi-Fi type.

In addition, the communicator 1250 may further include another form of local area communication (for example, near field communication (NFC), which is not shown, and Bluetooth low energy (BLE), which is not shown) other than Bluetooth.

The detector 1260 may include various detection circuitry and detect voice, an image, or an interaction of a user, and may include a microphone 1261, a camera part 1262, and an optical receiver 1263.

The microphone 1261 may receive an uttered voice of the user. The microphone 1261 may convert the received voice into an electrical signal and may output the electrical signal to the processor 1230. The user voice may include, for example, voice corresponding to a menu or a function of the display device 1200.

The camera part 1262 may obtain an image bezel, such as a still image or a moving image. An image captured by an image sensor may be processed by the processor 1230 or a separate image processor (not shown).

The image bezel processed by the camera part 1262 may be stored in the memory 1220 or may be transmitted to the outside through the communicator 1250. Two or more camera parts 1262 may be provided based on the configuration of the display device 1200.

The optical receiver 1263 may receive an optical signal (including a control signal) received from an external remote control device (not shown). The optical receiver 1263 may receive an optical signal corresponding to a user input (for example, a touch, a press, a touch gesture, a voice, or a motion) from a remote control device (not shown). A control signal may be extracted from the received optical signal under control by the processor 1230. For example, the optical receiver 1263 may receive a control signal corresponding to a channel up/down button for changing a channel, from the remote control device (not shown).

The I/O unit 1270 may include various input/output circuitry and receive video (for example, a moving image), audio (for example, voice, music), and additional information (for example, an EPG) from the outside of the display device 1200 under control by the processor 1230. The I/O unit 1270 may include at least one of a high-definition multimedia interface (HDMI) port 1271, a component jack 1272, a PC port 1273, and a USB port 1274. The I/O unit 1270 may include any combination of the HDMI port 1271, the component jack 1272, the PC port 1273, and the USB port 1274. An external image providing device (not shown) may be connected through the HDMI port 1271.

The video processor 1280 may include various video processing circuitry and process video data received by the display device 1200. In the video processor 1280, various image processing may be performed on video data, such as decoding, scaling, noise filtering, bezel rate conversion, and resolution conversion.

A graphic processor 1281 may include various graphics processing circuitry and generate a screen including various objects, such as an icon, an image, and text using an arithmetic unit (not shown) and a renderer (not shown). The arithmetic unit (not shown) may calculate an attribute value, such as a color, a size, a shape, a coordinate value, to display each object based on a layout of a screen using a user input that is detected by the detector 1260. The renderer (not shown) may generate screens in various layouts including an object based on the attribute value calculated by the arithmetic unit (not shown). The screen generated by the renderer (not shown) may be displayed on a display area of the display 1210.

The audio processor 1215 may include various audio processing circuitry and process audio data. The audio processor 1215 may perform various processing on the audio data, such as decoding, amplification, and noise filtering. In addition, the audio processor 1215 may include a plurality of audio processing modules to process audio corresponding to a plurality of contents.

The audio output unit 1226 may include various audio output circuitry and output audio included in the broadcast signal received through the tuner 1240 under control by the processor 1230. The audio output unit 1226 may output audio (for example, voice, sound) input through the communicator 1250 or the I/O unit 1270. In addition, the audio output unit 1226 may output audio stored in the memory 1220 under control by the processor 1230. The audio output unit 1226 may include at least one of a speaker 1227, a headphone output terminal 1228, and a Sony/Philips digital interface (S/PDIF) output terminal 1229. The audio output unit 1226 may include any combination of the speaker 1227, the headphone output terminal 1228, and the S/PDIF output terminal 1229.

The power supply unit 1290 may include a power supply and supply power input from an external power source to the components inside the display device 1200 under control by the processor 1230. In addition, the power supply unit 1290 may supply power output from one or more batteries (not shown) placed inside the display device 1200 to the components inside the display device 1200 under control by the processor 1230.

The sensing unit 1291 may include various sensors and sense a state of the display device 1200 or a state around the display device 1200, and may provide the information obtained by sensing to the processor 1230.

The sensing unit 1291 may include at least one of a magnetic sensor 1292, an acceleration sensor 1293, a temperature/humidity sensor 1294, an IR sensor 1295, a gyroscope sensor 1296, a position sensor (for example, global positioning system (GPS)) 1297, an atmospheric pressure sensor 1298, a proximity sensor 1299, and an RGB sensor 1301 (for example, an illuminance sensor), however, the example is not limited thereto. Since one skilled in the art may intuitively infer a function of each sensor from its name, a detailed description thereof may not be provided here.

The sensing unit 1291 may sense an external impact applied to the display device 1200.

In addition, a separate external device (for example, a set-top box, which is not shown) including the tuner 1240 may be electrically connected to the display device 1200 including the display 1210.

In addition, the display device 1200 may be implemented as an analog TV, a digital TV, a 3D-TV, a smart TV, an LED TV, an OLED TV, a plasma TV, and a monitor, however, one skilled in the art will understand that the example is not limited thereto.

Moreover, the illustrated block diagram of the display device 1200 is a block diagram of an example embodiment. Each component of the block diagram may be integrated, added, or omitted based on actually implemented specifications of the display device 1200. That is, two or more components may be combined into one component, or one component may be divided into two or more components, as necessary. In addition, a function performed by each block is for describing example embodiments, and a detailed operation thereof or a device does not limit the scope of the present disclosure.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (for example, the OS 1221, the application 1222) including one or more instructions that are stored in a storage medium (for example, the memory 1120, the memory 1220) that is readable by a machine (for example, the display device 110, the display device 1100, and the display device 1200). For example, a processor (for example, the processor 1130, the processor 1230) of the machine (for example, the display device 110, the display device 1100, and the display device 1200) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device comprising:
a communicator comprising communication circuitry configured to receive a wireless signal transmitted by a wireless router;
a memory configured to store one or more instructions; and
a processor configured to execute the one or more instructions stored in the memory,
wherein the processor is configured to:
continuously retrieve multipath channel characteristic data based on the wireless signal,
perform preprocessing on the retrieved multipath channel characteristic data of the wireless signal,
determine representative values for each reference time by calculating a similarity for each time period of result data corresponding to a result of the preprocessing,
determine a motion within a specified region of the display device, based on a change in the representative values over time, and
control the display device based on the determined motion within the specified region of the display device,
wherein the performing of the preprocessing comprises:
detecting a data gap in a first frequency band of multipath measurement characteristic data, and
removing the data gap by replacing the data gap with an amplitude value of a second frequency band adjacent to the first frequency band.

2. The display device of claim 1, wherein the controlling of the display device comprises operating the display device in a power saving mode, in response to no motion within the specified region of the display device being detected for a specified time.

3. A display device comprising:
a communicator comprising communication circuitry configured to receive a wireless signal transmitted by a wireless router;
a memory configured to store one or more instructions; and
a processor configured to execute the one or more instructions stored in the memory,
wherein the processor is configured to:
continuously retrieve multipath channel characteristic data based on the wireless signal,
perform preprocessing on the retrieved multipath channel characteristic data of the wireless signal,
determine representative values for each reference time by calculating a similarity for each time period of result data corresponding to a result of the preprocessing,
determine a motion within a specified region of the display device, based on a change in the representative values over time, and
control the display device based on the determined motion within the specified region of the display device,
wherein a number of subcarriers of the result data is less than a number of subcarriers of the multipath channel characteristic data before the preprocessing.

4. The display device of claim 1, wherein the processor is further configured to, as a part of the preprocessing, remove an outlier from the multipath channel characteristic data.

5. The display device of claim 1, wherein the processor is further configured to:
determine a first similarity value of a first frequency at a W+1-th time point by calculating a similarity between first amplitude data of the first frequency at a first time point to a W-th time point within a first window of the multipath channel characteristic data and second amplitude data of the first frequency at a second time point to the W+1-th time point within a second window, and
determine a representative value at the W+1-th time point, based on the first similarity value of the first frequency at the W+1-th time point and a second similarity value of a second frequency at the W+1-th time point.

6. The display device of claim 5, wherein the representative value at the W+1-th time point corresponds to an average value, based on the first similarity value and the second similarity value.

7. The display device of claim 1, wherein the processor is further configured to measure the motion based on a comparison result between the representative values and a threshold.

8. The display device of claim 7, wherein the threshold is configured to be adaptively adjusted depending on a distribution of the representative values.

9. A display device comprising: a communicator comprising communication circuitry configured to receive a wireless signal transmitted by a wireless router:
a memory configured to store one or more instruction; and
a processor configured to execute the one or more instructions stored in the memory,
wherein the processor is configured to:
continuously retrieve multipath channel characteristic data based on the wireless signal,
perform preprocessing on the retrieved multipath channel characteristic data of the wireless signal,
determine representative values for each reference time by calculating a similarity for each time period of result data corresponding to a result of the preprocessing,
determine a motion within a specified region of the display device, based on a change in the representative values over time,
control the display device based on the determined motion within the specified region of the display device, and
operate the display device in a power saving mode in response to no motion within the specified region of the display device being detected for a specified time.

10. A method of controlling a display device, the method comprising:
retrieving multipath channel characteristic data based on a wireless signal transmitted by a wireless router;
performing preprocessing on the retrieved multipath channel characteristic data of the wireless signal;
determining representative values for each reference time by calculating a similarity for each time period of result data corresponding to a result of the preprocessing;
determining a motion within a specified region of the display device, based on a change in the representative values over time; and
controlling the display device based on the determined motion within the specified region of the display device,
wherein the performing of the preprocessing comprises:
detecting a data gap in a first frequency band of multipath measurement characteristic data; and
removing the data gap by replacing the data gap with an amplitude value of a second frequency band adjacent to the first frequency band.

11. The method of claim 10, wherein the controlling of the display device comprises operating the display device in a power saving mode, in response to no motion within the specified region of the display device being detected for a specified time.

12. A method of controlling a display device, the method comprising:
retrieving multipath channel characteristic data based on a wireless signal transmitted by a wireless router;
performing preprocessing on the retrieved multipath channel characteristic data of the wireless signal;
determining representative values for each reference time by calculating a similarity for each time period of result data corresponding to a result of the preprocessing;
determining a motion within a specified region of the display device, based on a change in the representative values over time; and
controlling the display device based on the determined motion within the specified region of the display device,
wherein a number of subcarriers of the result data is less than a number of subcarriers of the multipath channel characteristic data before the preprocessing.

13. The method of claim 10, wherein the performing of the preprocessing comprises removing an outlier from the multipath channel characteristic data.

14. The method of claim 10, wherein the determining of the representative values comprises:
determining a first similarity value of a first frequency at a W+1-th time point by calculating a similarity between first amplitude data of the first frequency at a first time point to a W-th time point within a first window of the multipath channel characteristic data and second amplitude data of the first frequency at a second time point to the W+1-th time point within a second window; and
determining a representative value at the W+1-th time point, based on the first similarity value of the first frequency at the W+1-th time point and a second similarity value of a second frequency at the W+1-th time point.

15. The method of claim 10, wherein the measuring of the motion comprises determining the motion based on a comparison result between the representative values and a threshold.

16. The method of claim 15, wherein the threshold is adaptively adjusted depending on a distribution of the representative values.

17. A method of controlling a display device, the method comprising:
retrieving multipath channel characteristic data based on a wireless signal transmitted by a wireless router;
performing preprocessing on the retrieved multipath channel characteristic data of the wireless signal;
determining representative values for each reference time by calculating a similarity for each time period of result data corresponding to a result of the preprocessing;
determining a motion within a specified region of the display device, based on a change in the representative values over time; and
controlling the display device based on the determined motion within the specified region of the display device,
wherein the controlling of the display device comprises operating the display device in a power saving mode, in response to no motion within the specified region of the display device being detected for a specified time.

18. A non-transitory computer-readable storage medium having recorded thereon instructions that, when executed by a processor, cause the processor to perform the operations of claim 10.

19. A display device comprising:
a memory configured to store one or more instructions; and
a processor configured to execute the one or more instructions stored in the memory,
wherein the processor is configured to:
continuously retrieve multipath channel characteristic data based on a wireless signal transmitted by a wireless router,
perform preprocessing on the retrieved multipath channel characteristic data of the wireless signal,
determine representative values for each reference time by calculating a similarity for each time period of result data corresponding to a result of the preprocessing,
determine a motion within a specified region of a display device, based on a comparison result between the representative values and an adaptive threshold, and control a power mode of the display device to be in a power saving mode based on the determined motion indicating no motion within the specified region of the display device.

20. The display device of claim 19, wherein, as part of the preprocessing, the processor is further configured to:
   detect a data gap in a first frequency band of multipath measurement characteristic data, and
   remove the data gap by replacing the data gap with an amplitude value of a second frequency band adjacent to the first frequency band.

* * * * *